Dec. 17, 1968  R. M. VOITIK  3,416,808
FLOATING-ANTIROTATION DEVICE
Filed Feb. 9, 1967
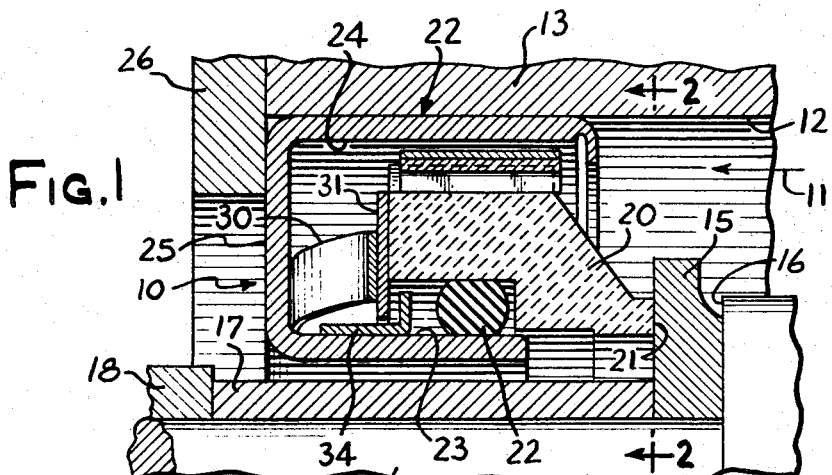
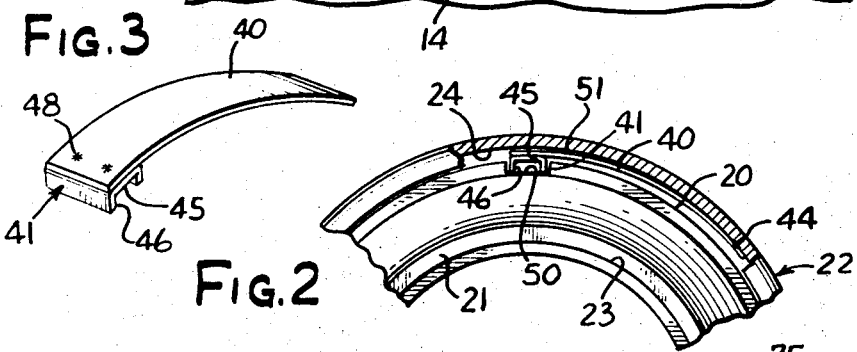
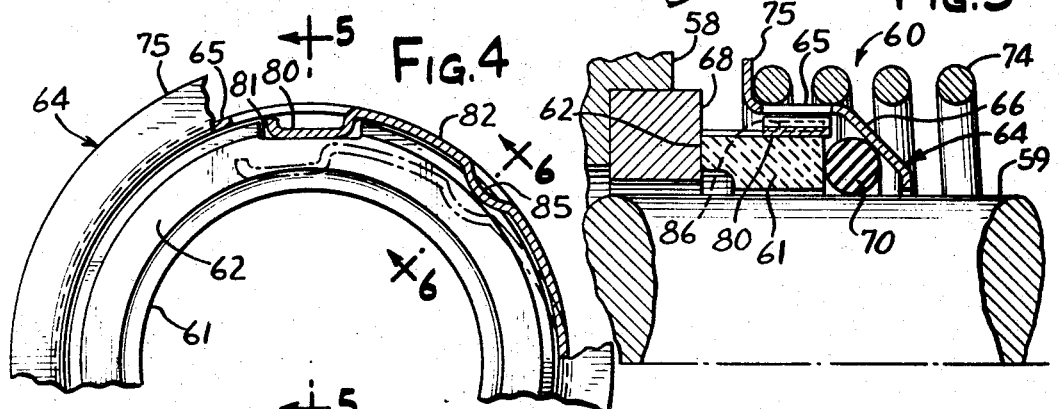
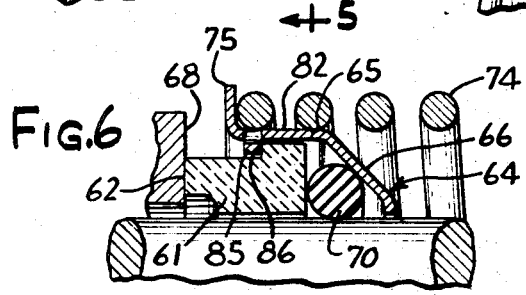
INVENTOR
ROBERT M. VOITIK
by: Wolfe, Hubbard, Voit & Osann
ATTYS.

United States Patent Office 3,416,808
Patented Dec. 17, 1968

3,416,808
FLOATING-ANTIROTATION DEVICE
Robert M. Voitik, Glenview, Ill., assignor to Continental Illinois National Bank and Trust Company of Chicago, trustee
Filed Feb. 9, 1967, Ser. No. 614,913
5 Claims. (Cl. 277—40)

ABSTRACT OF THE DISCLOSURE

A rotary face seal in which one of the annular sealing rings is held against rotating friction by an anchor fitting in a peripheral notch in the ring, with the anchor being mounted on a resilient member.

---

This invention relates generally to rotary face seals and, more particularly, to an anchor for a sealing ring in such seals.

In some recently developed rotary seals the annular carbon sealing ring of the seal is secured against rotation relative to the casing surrounding the ring by a metal anchor secured to the casing and received in a corresponding slot formed in the periphery of the ring. In seal applications involving severe vibration, the direct contact of the anchor with the carbon ring has been found to cause wear to the slot, weakening the ring or causing it to jam against the anchor so that free axial movement of the ring is restricted.

It is an object of the present invention to provide an improved arrangement for anchoring an annular sealing ring in a rotary face seal against rotation relative to the surrounding casing.

Another object is to provide a rotary seal adapted to prevent relative radial movement between the anchor and ring even during operating conditions involving severe vibration, while allowing the ring to float axially in proper sealing contact.

A further object is to provide a rotary seal of the above kind in which the anchor is flexibly secured to its casing so that radial movement between the annular sealing ring and anchor will not occur while the ring experiences vibrational effects within the casing.

Still another object is to provide a rotary seal as characterized above that is adapted to dissipate or dampen radial vibrational movement of the stator with respect to the casing.

Yet another object is to provide a rotary seal of the character set forth in which the flexible anchor is also formed to limit axial movement of the sealing ring relative to the casing.

Other objects and advantages of the invention will become apparent upon roading the following detailed description and upon reference to the drawings in which:

FIGURE 1 is a fragmentary longitudinal section through a shaft and housing assembly including a seal embodying the invention;

FIG. 2 is a reduced scale, fragmentary end elevation in partial section of the seal shown in FIG. 1;

FIG. 3 is a perspective of the anchor and connecting spring employed in the seal shown in FIG. 1;

FIG. 4 is a fragmentary end elevation in partial section of an alternative embodiment of the invention;

FIG. 5 is a fragmentary longitudinal section of the seal shown in FIG. 4 taken substantially in the plane of line 5—5; and FIG. 6 is a fragmentary section taken substantially in the line 6—6 in FIG. 4.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined in the appended claims.

Referring more specifically to FIG. 1, there is shown a rotary shaft assembly including a rotary seal 10 constructed in accordance with the invention. The seal 10 restricts fluid leakage in the direction of an arrow 11 through an opening 12 between a housing 13 and a relatively rotatable shaft 14. The seal 10 is of the face seal type and includes a rotor 15, locked to the shaft 14 against a shoulder 16 by sleeves 17 and 18, which cooperates with an annular sealing ring 20 having a flat, lapped sealing surface 21 that engages the rotor 15.

The ring 20 which in this case serves as the stator of the assembly, is mounted in a casing 22 which is an annular unit having opposed inner and outer cylindrical walls 23 and 24, respectively, between which the stator ring is loosely fitted. The casing 22 is formed as a single piece with an integral annular portion 25 spacing the opposed walls 23, 24. The casing 22 is sealed in the opening 12 and locked in place by a plate 26 which is secured to the housing 13.

In order to bias the sealing surface 21 against the rotor 15, a wave spring 30 is interposed between the casing portion 25 and a washer 31 disposed immediately adjacent the stator. A seal is provided between the stator ring 20 and the casing 22 by a resilient sealing member in the form of an O-ring 32 interposed between the inner casing wall 23 and the stator. A flanged retainer 34 is fitted between the washer 31 and the O-ring 32 so as to limit axial movement of the O-ring.

In accordance with the invention, the annular sealing ring and surrounding casing are locked against relative rotation by an anchor resiliently supported and urged into engagement with a notch formed in the periphery of the ring. In the seal 10a, an anchor 41 is mounted on a curved resilient spring 40. The anchor 41 is channel-shaped having a back portion 45 secured to the free end of the spring 40, as by weldments 48, so that a pair of generally parallel legs 46 extend radially inward. The spring 40 is secured at its opposite end to the outer casing wall by weldments 44 so that the anchor legs 46 engage an axially disposed peripheral notch 50 formed in the stator ring 20, thereby locking the stator ring and casing against relative rotational movement.

In order to maintain the anchor 41 in firm engagement with the notch 50, the spring 40 is preformed with a diameter of curvature which is less than the diameter of the annular stator 20. It is apparent that when operating conditions cause the annular ring 20 to be radially vibrated within the seal casing 22, the anchor 41 rides in the notch 50 in concert with the ring under the constant urging force of the spring. Since there is no relative radial movement between the ring 20 and anchor 41, wear to the notch 50 is substantially prevented.

It should be appreciated that the force of the spring 40 on the annular ring 20 is of such magnitude to steady the anchor in the notch while not interfering with the free axial movement of the ring which takes place in seals of this type. Moreover, since the flexible anchor means of the present invention prevents wear to the notch which heretofore often has caused axial ring movement to jam against the anchor, the invention achieves more reliable seal operation.

An additional feature of the invention is that the spring 40 also tends to prevent and dampen radial vibrational movement of the ring 20 within the casing 22. It is apparent that the force of the spring 40 on the ring first must be overcome by vibrational forces before radial movement of the ring can take place. In addition, the spring 40 constantly tends to dissipate or dampen any vibrating movement of the ring 20 which does occur. As the ring experiences such vibration, the free end of the spring moves with the ring 20 so that a small space 51 between the spring 40 and outer casing wall 24 is varied. When fluid is being sealed by the assembly, the oscillating movement of the spring 40 relative to the casing 24 creates a pumping action on the fluid in the restricted space 51 which tends to dampen or slow down the movement of the spring and thus dampen the vibration of the ring.

An alternative embodiment of the invention is shown in FIGURES 4 through 6. There is shown in these figures a rotary seal assembly 60 which restricts fluid leakage between a housing 58 and a relatively rotatable shaft 59. The rotary seal includes an annular sealing ring 61 having a flat sealing surface 62. The annular ring 61, which in this case functions as the rotor, is slidably mounted for rotation on the shaft 59 so that the sealing surface 62 is adapted to cooperate with a stationary lapped sealing surface 68 contiguous with the housing 69. The annular sealing ring 61 is loosely mounted within a casing 64 which defines an outer cylindrical wall 65 and an inclined wall 66.

In order to provide a seal between the annular ring 61 and the shaft 59, a resilient sealing member 70 is disposed in the small space defined by the shaft 59, the back side of the annular ring 61, and the inclined casing wall 66. To maintain the casing 64 and annular sealing ring 61 in a forward position so that the surface 62 of the ring is in sealing contact with the lapped surface 68 of the housing, an annular spring 74 is interposed between a radially extending flange 75 of the casing and an appropriate stopping means secured to the shaft.

In keeping with the invention, the annular sealing ring 61 and casing 64 are locked against relative rotation by an anchor 80 resiliently urged into engagement with a notch 81 formed in the periphery of the ring 61. In this case, the anchor is formed at the end of an elongated tab 82 which is pierced from the wall 65 of the casing 64 so that the anchor 80, resilient tab 82, and casing 64 are a single unit. The tab 82, which serves as a resilient spring member, may be formed with such a curvature as to create the desired urging force upon the annular sealing ring. As shown in phantom in FIG. 4, when the tab 82 is in an unassembled position, the anchor and tab extend a distance into the casing. To assemble the ring 61 within the casing, the tab must be raised until the anchor can be snapped in place in the notch. The flexible connection between the ring and casing accomplishes the above described advantages.

In accordance with a further aspect of the invention, the resilient tab or spring 82 is adapted to positively retain the annular sealing ring 61 within the casing 64. In the illustrated embodiment shown in FIGURES 4 through 6, the outer edge of the tab 82 is formed with a sheared nitch 85 which abuts against a shoulder 86 formed on the ring 61 when the ring is assembled within the casing. The urging force of the tab against the ring causes the nitch 80 to remain axially adjacent the shoulder 86 even during operating conditions involving severe vibration so that axial movement of the ring relative to the casing is limited. It is apparent that although a nitch 85 has been shown in the illustrated embodiment, alternatively the spring 82 may be formed with a depending flange, dimple or the like, against which the annular sealing ring may abut.

It should be appreciated that the rotary seal assembly of the present invention not only operates reliably and efficiently without undersirable wear to the carbon sealing ring, but is simple in construction and economical to manufacture.

I claim as my invention:

1. A rotary seal assembly for providing a fluid seal between a housing and a relatively rotatable shaft comprising in combination, an annular casing surrounding said shaft and defining a cylindrical wall, an annular sealing ring loosely positioned adjacent said wall within said casing, and an elongated spring secured at one end to said casing wall and having an axially disposed anchor member at an opposite free end, said annular sealing ring having an axially disposed peripheral notch which receives said anchor so as to lock said casing and ring against relative rotation.

2. The rotary seal assembly of claim 1 in which said spring has a preformed curvature of a diameter less than the diameter of said annular stator.

3. The rotary seal assembly of claim 1 in which said anchor is channel shaped having a back portion and generally parallel sides, and said back portion is secured in axially disposed relation to said spring so that said sides engage said notch.

4. The rotary seal assembly of claim 1 in which said elongated spring is formed with a depending flange adapted to retain said ring within said casing.

5. The rotary seal assembly of claim 1 in which said elongated spring is formed integrally from said casing, and said spring is bent to define a notch for retaining said ring within said casing.

References Cited

UNITED STATES PATENTS

| 3,193,298 | 7/1965 | Voitik et al. | 277—40 |
| 3,245,692 | 4/1966 | Voitik | 277—40 |
| 3,278,191 | 10/1966 | Gits et al. | 277—40 |

SAMUEL ROTHBERG, *Primary Examiner.*

U.S. Cl. X.R.

277—87, 93